Figures 1, 2:
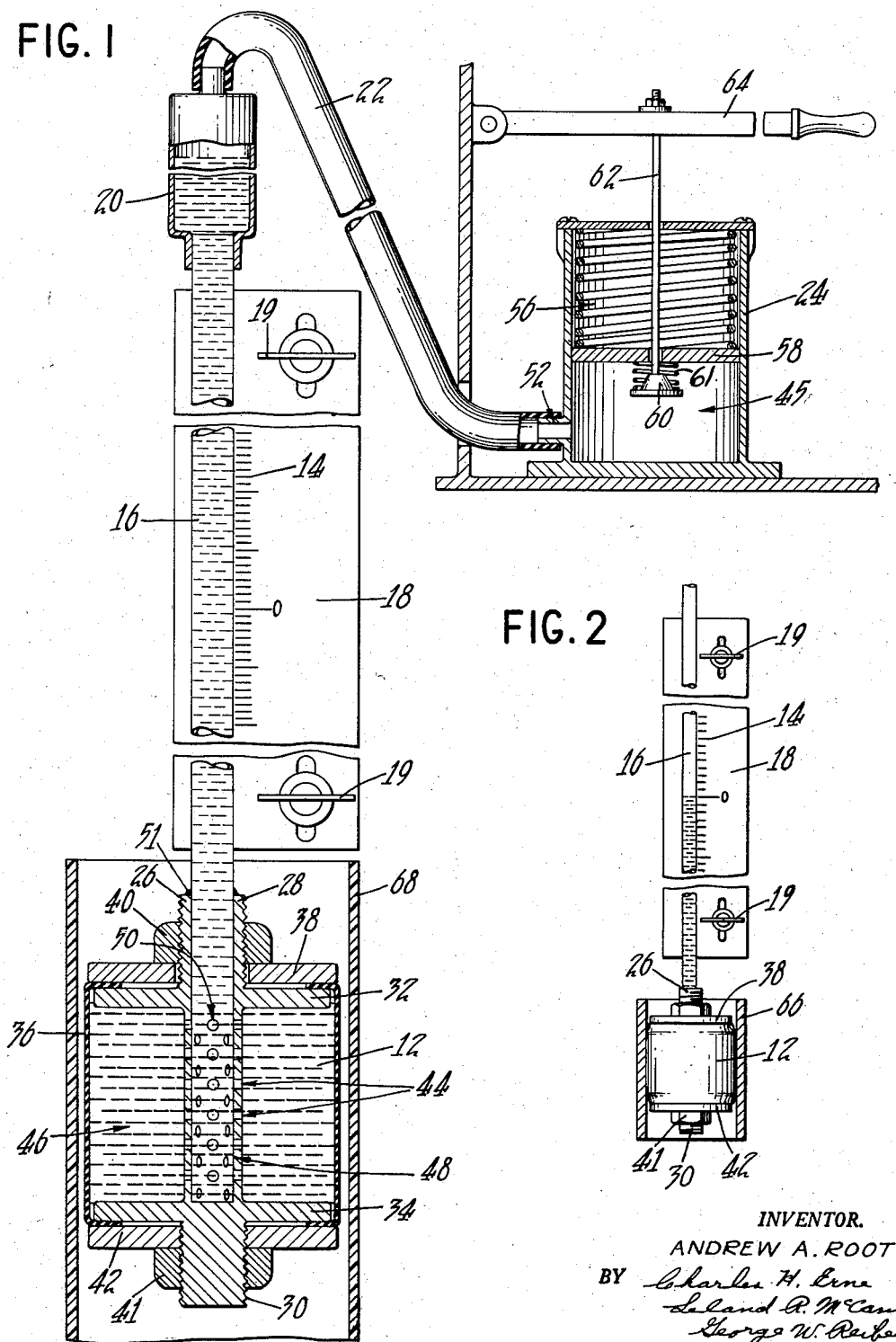

May 26, 1959　　　A. A. ROOT　　　2,887,777
MEASURING DEVICE
Filed Dec. 3, 1956

INVENTOR.
ANDREW A. ROOT
BY Charles H. Erne
Leland R. McCann
George W. Reiber
ATTORNEYS United States Patent Office 2,887,777
Patented May 26, 1959

2,887,777

MEASURING DEVICE

Andrew A. Root, Concord, Mass., assignor, by mesne assignments, to American Can Company, New York, N.Y., a corporation of New Jersey Application December 3, 1956, Serial No. 625,802

5 Claims. (Cl. 33—178)

This invention relates to a measuring device and more particularly to an improved device for measuring the internal diameter of soft walled flexible tubing.

With the advent of the thin walled polyethylene flexible tubing, it became desirable to assemble the tubing with other parts to form various articles, for example certain types of dispensing containers known as "squeeze bottles." It therefore became necessary, in order to meet the close manufacturing tolerances required for such assembly, to be able to measure accurately the internal diameter of tubing of the described type.

It can be appreciated that if any metal type caliper were used to measure the inside diameter of a soft walled tube that the metal would distort the wall and thereby give inaccurate measurements.

Accordingly, it is the first object of this invention to provide an improved device for measuring the internal diameter of a soft walled flexible tubing.

It is a further object of this invention to provide a device for measuring the mean diameter of a unit length of soft walled flexible tubing.

It is a still further object of this invention to provide an improved device for measuring the mean diameter of a unit length of flexible tubing wherein provision is made for facilitating the insertion or removal of the measuring device for tubing measurement.

Numerous other objects and advantages of the invention will be apparent as it is better understood from the following description, which, taken in connection with the accompanying drawings, discloses a preferred embodiment thereof.

Briefly, this invention relates to an improved mechanism wherein a unit length, variable volume reservoir is provided with coaxial, fixed, end flanges and a thin flexible circumferential wall which is connected for liquid passage with a measuring means including an indicator tube. The reservoir and the indicator tube are filled with a discernible liquid so that when the device is inserted into a length of tubing to be measured, the liquid column in the indicator tube is commensurate with the diameter of the tubing being measured.

With reference to the drawing:

Figure 1 is a schematic front elevational view of the working mechanism of the improved tubing measuring device; and Fig. 2 is a sectional view showing the calibration of the measuring instrument by means of a master ring gage.

In a preferred or exemplary embodiment of this invention, the measuring device comprises a reservoir 12, measuring means 14, including a glass indicator tube 16 and an adjustable gage 18, an overflow reservoir 20, a length of flexible tubing 22 and a deflating device 24.

The fluid reservoir 12 comprises a hollow stem 26 which has been threaded at its upper end 28 and its lower end 30. Intermediate its threaded ends, it is provided with an upper flange 32 and lower flange 34. These flanges are coaxially displaced a predetermined distance, which in one embodiment is 1 inch.

A cylindrical flexible rubber diaphragm-like tube 36 is positioned over the upper flange 32 and the lower flange 34 in such a manner that its upper peripheral end is bent over the flange 32 and clamped in place by a guide washer 38 which is squeezed towards the flange 32 by the nut 40, which engages the upper threaded end 28 of stem 26. In this manner the upper peripheral end of the tube 36 is securely held in a liquid tight seal between the guide washer 38 and the flange 32. In a similar manner the lower end of the tube 36 is bent around the flange 34 and gripped by the washer 42 which is urged towards the flange 34 by the nut 41. With this construction a variable volume cylinder having a fixed or unit length and expandable cylindrical walls is provided.

The stem 26, intermediate the flanges 32 and 34, has a plurality of radial ports 44 which extend from the cylindrical space 46 into the hollow center 48 of the stem 26. In this manner liquid poured into the center of stem 26 will pass through the ports 44, fill the cylindrical space 46 and cause radial expansion of the cylindrical tube 36. The glass indicator tube 16 is connected to the center of the stem 26 and in a preferred embodiment extends to the bottom of its central opening 48 and into engagement with the upper surface of flange 34. The tube 16 has a plurality of radial apertures 50 which permit the passage of fluid from the tube through the apertures 50 and the ports 44 into the cylindrical space 46. The only qualification is that the tube 16 must be fixed, as by cement 51, to the stem 26 so that the volume of the combined tube 16 and the stem 26 will not vary. The tube 16 is provided at its upper end with a storage tank 20 which may be defined simply as being of sufficient volume to hold a quantity of liquid which will permit the flexible walls 36 to be radially compressed within the limits of guide washer 38 and thereby be freely slideable within the tube to be measured.

The upper end of the storage chamber 20 is connected by the flexible tube 22 to the port 52 of a common bicycle type pump 24. The latter has a vacuum chamber 45 and a venting chamber 56 separated by a piston 58 having a valve 60. The construction of such a pump is well known and, therefore, for purposes of explanation it will simply be stated that the valve 60 is spring biased to an open position by spring 61 and is equipped with a stem 62 which is attached to a pivotally supported handle 64. When the handle 64 is raised valve 60 closes and raises piston 58 to reduce the pressure in the vacuum chamber 45, which as the name implies, reduces the pressure within the tube 22 causing liquid from the cylindrical space 46 to pass up through the tube 16 into the storage reservoir 20. It is apparent that by manipulating the pump 24, any desired quantity of the liquid can be raised up into the chamber 20.

Assuming that a sufficient quantity of liquid has been pumped into the storage chamber 20, the reservoir 12 is then inserted within a standard ring 66 and the pump 24 is released (i.e. valve 60 is opened) to permit the fluid to flow from the reservoir 20 down through the tube 16 into the cylindrical chamber 46 and radially urge wall 36 into intimate contact with the inner wall of the standard ring 66. At this point liquid level in the tube 16 is noted and the zero point of the gage 18 is adjusted by means of the wing nuts 19 so that it lines up with the meniscus of the liquid in the tube 16. The pump 24 is again operated to withdraw a quantity of the liquid from the cylindrical chamber 46 into the storage chamber 20 whereupon the standard ring 66 is removed from the reservoir 12 and a tube to be measured, as for example the tube 68, is fitted over the reservoir 12 whereupon valve 60 is again released to permit the liquid to flow from chamber 20 down into the liquid reservoir 46 to urge the flexible walls of cylinder 36 into contact with the wall of the tube 68. Then the meniscus level is read on the gage 18 and the variation from the zero point is representative of the mean diameter of the tube 68 over the unit length. When the reading has been noted the pump 24 is again manipulated to withdraw the liquid from the cylindrical chamber 46 and the tube 68 is removed from chamber 12.

It has been found by the use of this improved device that a very satisfactory measuring device is provided for calibrating the inner diameter of a length of tubing.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device for measuring the internal diameter of tubing comprising a fixed length cylindrical reservoir having a flexible radially expandable circumferential wall positioned and adapted to engage directly the interior surface of the tubing to be measured, measuring means including a tube connected for fluid passage with said reservoir, said reservoir and measuring tube containing a discernible liquid whereby when said device is employed to measure a section of tubing, said reservoir flexible wall intimately engages the wall of the tubing to be measured and the level of liquid in said measuring tube indicates the mean diameter of said tubing along a length equal to said fixed length and lying in contact with said reservoir.

2. The mechanism of claim 1 being further provided with means for deflating said flexible walled reservoir to facilitate its insertion and removal relative to tubing to be measured.

3. A device for measuring the mean internal diameter of a unit length of tubing comprising a reservoir having a flexible cylindrical wall positioned and adapted to engage directly the interior surface of the tubing to be measured and fixedly positioned rigid coaxial end members defining a variable volume unit length reservoir, measuring means including an indicator tube connected for fluid passage with said reservoir, said reservoir and tube containing a discernible liquid, whereby when said device is employed to measure a section of tubing said flexible cylindrical wall intimately engages the wall of the tubing to be measured and the liquid level in said indicator tube indicates the mean diameter of the unit length of said tubing.

4. A mechanism in accordance with claim 3 wherein said reservoir comprises a hollow axial stem, a pair of cylindrical end flanges fixedly positioned and spaced apart in coaxial relation on said stem, a thin wall cylindrical tube interconnected with said end flanges to define said unit length flexible circumferential walled cylindrical reservoir, said axial stem being connected with said indicator tube to permit liquid passage between said indicator tube and reservoir to vary the liquid level in said indicator tube in response to the expansion and contraction of said cylindrical wall.

5. The mechanism of claim 3 being further provided with means for deflating said flexible walled reservoir to facilitate its insertion and removal relative to tubing to be measured.

References Cited in the file of this patent

UNITED STATES PATENTS

| | | |
|---|---|---|
| 1,676,248 | Bryant | July 10, 1928 |
| 2,508,496 | Conzelman et al. | May 23, 1950 |
| 2,566,970 | Swensson | Sept. 4, 1951 |